United States Patent [19]
Lehmann

[11] 3,907,361
[45] Sept. 23, 1975

[54] CONTROL MEANS FOR THE POSITION OF A VEHICLE SEAT

[75] Inventor: Gerhard Lehmann, Remscheid, Germany

[73] Assignee: Fritz Keiper, Remscheid, Germany

[22] Filed: Feb. 6, 1974

[21] Appl. No.: 440,035

[30] Foreign Application Priority Data
Feb. 8, 1973 Germany............................ 2306088

[52] U.S. Cl............. 297/385; 280/150 SB; 297/367
[51] Int. Cl......................... A62b 35/00; A47c 3/02
[58] Field of Search ........... 297/379, 385, 388, 216, 297/367; 24/230 R, 230 A; 280/150 SB; 296/65 R, 65 A

[56] References Cited
UNITED STATES PATENTS
2,959,206  11/1960  Tedesco............................. 297/367
3,278,231  10/1966  Hirsch et al....................... 24/230 R
3,333,891  8/1967  Werner et al.................... 297/367 X

*Primary Examiner*—James T. McCall
*Attorney, Agent, or Firm*—Michael S. Striker

[57] ABSTRACT

An arrangement for adjusting the position of a vehicle seat backrest from upright to lying-down position is combined with an arrangement for limiting such tilting, for example to a position in which the backrest is tilted from the upright position by only 30°, in dependence upon the operational condition of the vehicle. The limiting arrangement may be controlled by application or release of the safety belts, for limiting the tilting angle of the backrest when the belts are applied.

10 Claims, 3 Drawing Figures

CONTROL MEANS FOR THE POSITION OF A VEHICLE SEAT

NATURE OF THE INVENTION

This invention relates to tilt control mechanism for seats in a vehicle such as an automobile, wherein the means for adjusting the tilting angle of the seat back or backrest relative to the seat member allows wide-angle tilting, for example from upright to lying-down position of the backrest. The invention intends to limit the actually usable tilting angle to a fraction of the potentable possible tilting angle in dependence upon the operative condition of the vehicle, for example in dependence upon application of the safety belts associated with the seat, to prevent accidental tilting to an excessive and dangerous degree when the vehicle is under way or is being readied to get under way.

BACKGROUND OF THE INVENTION

The invention relates to a seat for a vehicle such as an automobile, having control means for controlling the tilting of the back relative to the seat, from an upright to a lying-down position. Seats of this kind are usually equipped with two pairs of strap members, each pair being installed on one side of the seat and comprising strap means secured to the seat; strap means secured to the back and means for mutually adjustably positioning these strap means in and for the chosen angular position or tilt of the back. It is further usual that the mechanism allows tilting of the back from fully upright to fully lying-down position, but there arises the danger, particularly in automobiles, that the user of the seat intentionally or unintentionally lowers the back, that is, moves it to or towards its lying-down position, at times when the operation of the vehicle makes such a lowering unsafe. For example, it is known that the protective effect of safety belts is converted into a hazard if the back member is tilted back by more than a certain angle, such as 30° from its upright position, while the vehicle is in motion. Thus it becomes desirable in one important operational condition of the vehicle —namely during forward travel— to limit the tiltability of the back to only an initial portion of its total potentially possible tilting angle; analogous limitations of the tilting angle may be desirable in other instances.

SUMMARY OF THE INVENTION

Therefore, it is an object of the invention to avoid any danger to the user of a vehicle seat, which danger could arise from unlimited tilting of the seat back, at times when such unlimited tilting is inappropriate in view of the operative condition of the vehicle.

In accordance with the invention this object is achieved, in substance, be releasable stop and striking means, operable in dependence upon the operative condition of the vehicle, to limit the usable tilting angle of the back member, releasably, to a portion of the total tilting angle. By such releasable striking means it becomes possible in each operative condition of the vehicle to establish a suitable limit for the tilting angle of the seat back.

Since the striking means according to the invention is controlled as a function of the operative condition of the vehicle, the invention limits the dangers hitherto caused by the driver's negligence or lack of experience or knowledge, for the control of the stop and striker can be arranged so that, whenever danger could be caused be excessive tilting-back of the back member, the actually usable tilting angle is definitely limited to a harmless fraction of the total potential tilting angle.

In detail, the invention can be embodied in a variety of arrangements wherein the striking device can engage the tilting elements for the seat and the back at different locations. The tilt limiting devices can be provided at chosen locations on a seat; but usually it is preferred to provide one of the two pairs of strap members with the stop and striker. This allows a saving of space and assures a particularly reliable functioning of the mechanism. It is further preferred that one strap member of a pair has the stop means and the second strap member of the pair has the releasable striking means provided thereon. It is possible to form the stop as a projection extending either transversely of or parallel to the width of a strap member, at a radial distance from the axis about which relative tilting of these members occurs; however, it is particularly simple to form the stop as a step in an arcuate surface forming part of the contour of a strap member. This has also the advantage of calling for particularly little space. The striking means can be formed by any elements, shiftable by means of the aforesaid control, but it is particularly preferred to form it as a swingable latch.

It is possible to control the latch or other striking means in various ways, for example by an electromagnetic positioning device, particularly where electric circuits are employed for other control purposes in the vehicle; however, in many applications, mechanical control of the striking means is to be recommended. Therefore the invention particularly and preferably uses strap means, secured for example to a safety belt of the seat and provided with control means for mechanically controlling the tilt limiting mechanism as a function of the application of the seat belt to, or its release from, a user. In such an arrangement tilting of the back is limited to a safe angle when the safety belts are applied, i.e. when the two parts of the belt buckle are engaged with one another. Such mechanical control may comprise a feeler in or on one of the buckle parts, which is displaced when this one part of the buckle engages with the other part thereof. This feeler then moves the striking means into its operative position when the feeler is displaced from its normal position by engagement of the two buckle parts with one another. Such a feeler mechanism is particularly useful in cooperation with striking means in form of a bellcrank lever, comprising the tilt controlling device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
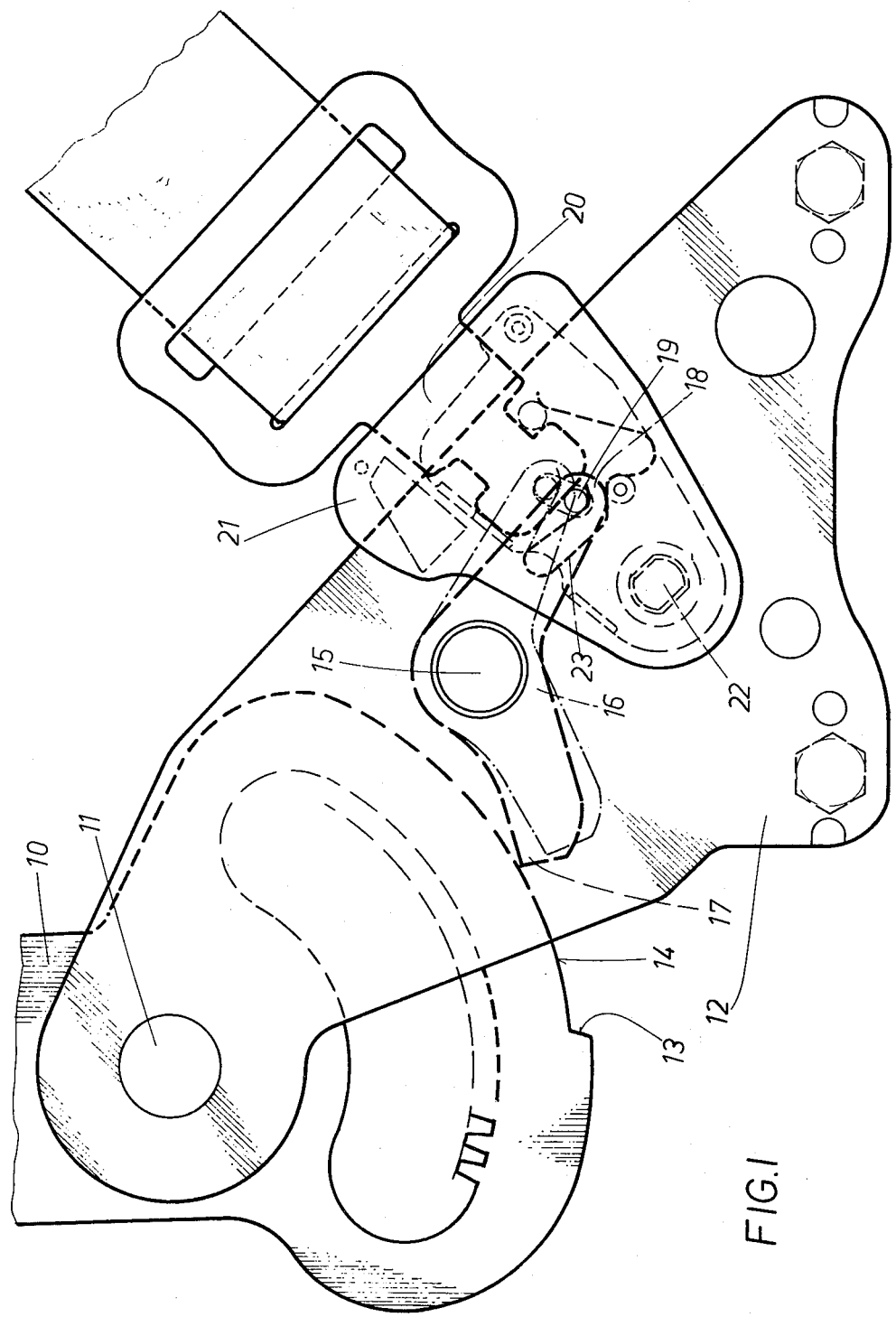
FIG. 1 of the drawing is a schematic side view of an embodiment of the invention.

Strap member 10, forming one part of a pair of strap members, is rigidly secured to the back rest (not shown) of a seat, for example a driver's seat or other front seat of an automobile. The actual seat member (not shown) of the seat has secured to it a strap member 12 which is tiltably coupled to the strap member 10 by a pivot pin 11. For tilting the back into the desired position the mechanism has adjustable tilt control means, known to the art, which are not illustrated in full detail but which may include the illustrated arcuate slot in strap member 10, with arcuate gear rack means being formed so as to extend an edge of the slot, as indicated, and with suitable pinion means or the like, not shown, for securing the back in any one of the desired tilt angles; the slot is illustrated as extending over approximately 90° around pin 11, thereby allowing tilting of the back from the illustrated upright position (to be inferred from the upright orientation of strap member 10) into a horizontal or lying-down position.

According to the invention the strap member 10 has an arcuate edge which is located radially outwardly of the aforementioned control slot, with a step 13 being formed in this edge, the arrangement being such that one part 14 of the edge is disposed at a smaller radial distance from pivot pin 11 than the other or outer part of the edge. The other strap member 12 has a pin 15 which tiltably carries a latch or pawl 16 to provide striking means in cooperation with step 13; this latch is formed as a bellcrank lever having a striker arm 17 and a control arm 18. As illustrated the stop provided by the step 13 is positioned at approximately 30° from one end of the arcuate edge of strap member 10, so as to cooperate with the latch 16 when the back is correspondingly tilted.

The drawing shows the operative portion of the latch 16 in heavy dashed lines, while showing the inoperative position of the latch in thin dash-dot lines. The control arm 18 of the latch 16 has a feeler pin 19 which is shown as projecting transversely from the side faces of the latch 16 into an inner space or cavity which is provided for reception of a belt-buckle member 20, in the cooperating belt-buckle member 21 that is secured by holding pin 22 to the strap member 12. The members 20, 21 have releasable locking means for holding the member 20 in the member 21, this latter construction being known by itself from all commonly used seat-belt buckles and being only suggested in the drawing; it is not believed to be in need of detailed description.

Figure 2:
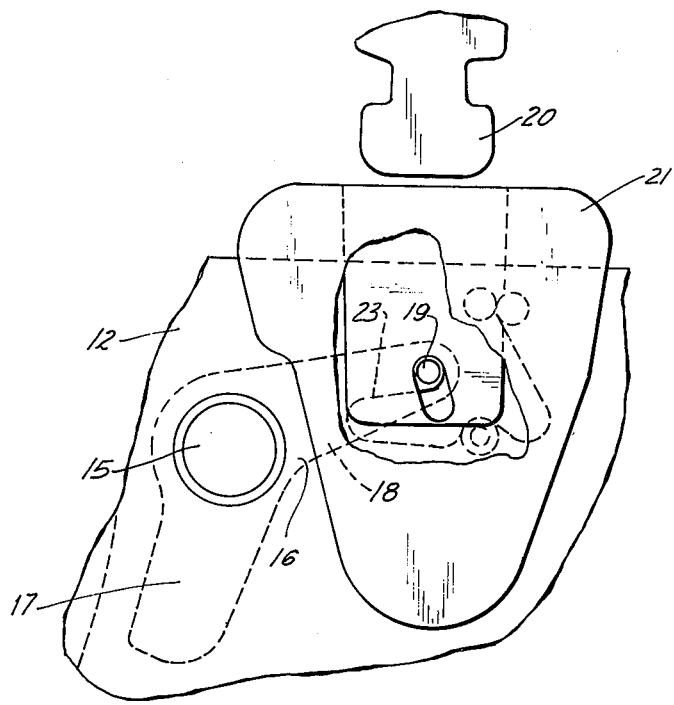
FIGS. 2 and 3 are partially broken-away detail views, showing the control arrangement of the embodiment in FIG. 1 in two operative positions.
Figure 3:
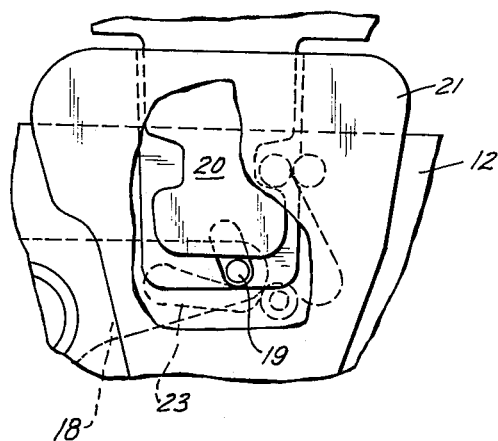

Also provided is a flat spring arm 23, mounted in the member 21 and engaging the feeler pin 19 so as to permanently tend to pivot the latch 16 in counterclockwise direction. Accordingly, if the space within the member 21 is empty because the member 20 is not received in it (see FIG. 2), the spring arm 23 urges latch 16 into its inoperative position shown by dash-dot lines, wherein striker arm 17 is located outside of striking range with respect to step 13, so that in this condition the strap member 10 is fully tiltable relative to the strap member 12, and the back can be tilted to lying-down position. By contrast, when the member 21 has received the member 20 in its inner space (see FIG. 3), that is when the user of the seat has strapped himself in, the member 20 counteracts the spring arm 23 and turns latch 16 in clockwise direction, so that the striker arm 17 then extends into its striking position in which it engages with the step 13. This arrangement reliably prevents tilting of the back, either intentionally or unintentionally, beyond the partial tilting scope permitted by the step 13. When member 20 is released from member 21, the latch 16 is thereby permitted to automatically return into its initial dash-dot position, thus removing the limitation with respect to the usable tilting angle, i.e. permitting the member 10 and its associated seat back to be tilted as far back as desired.

It will be understood that the illustrated embodiment is only one of the possible forms of the invention. Striking means, such as latch 16, can be controlled in other ways than via the illustrated mechanical control employing the seat-belt buckle, for example, by magnetic, electromagnetic, pneumatic or hydraulic means. Instead of forming the stop as a contour step 13 is can be formed as a pin or the like projecting from the side surface of the stop means. Instead of providing the tilt limiting mechanism in form of only one pair of stop members on a seat, such members can be provided on both sides of a seat, with coincident control thereof.

It will be understood that each of the elements described above, or two or more together, may also find a useful application in other types of constructions differing from the types described above.

While the invention has been illustrated and described as embodied in a vehicle-seat backrest tilt control, it is not intended to be limited to the details shown, since various modifications and structural changes may be made without departing in any way from the spirit of the present invention.

Without further analysis, the foregoing will so fully reveal the gist of the present invention that other can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

What is claimed is:

1. Control means for a tiltable vehicle seat having a back member and a seat member, comprising a first strap member secured to said back member; a second strap member secured to said seat member; first means for pivoting said strap members relative to one another between an upright end position and a reclining end position through a plurality of adjustable intermediate tilting positions; a releasable system of stop and striker devices, one device being provided on said first strap member and the other on said second strap member; second means which is intended to be operated by a user of the vehicle before the vehicle begins to move; and third means for placing one of said devices into operative position thereof in which it engages the other device in response to tilting of said back member towards said reclining position through only a part of its entire tilting range, subsequent to operation of said second means and independently of operation of said first means.

2. Apparatus according to claim 1, comprising two pairs of said strap members located at opposite lateral sides of the seat, only one of said pairs having said system of stop and striker devices.

3. Apparatus according to claim 2, wherein said striker device is a leverage member movable into and out of said operative position.

4. Apparatus according to claim 3, wherein the stop device comprises a contour portion of one of said strap members.

5. Apparatus according to claim 1, wherein the striker device is a latch pivotally secured to one of said strap members.

6. Apparatus according to claim 3, wherein the stop device constitutes a part of said first strap member.

7. Apparatus according to claim 1, wherein said second means is a safety belt of the vehicle.

8. Apparatus according to claim 7, wherein said controllable means comprises a pair of belt-buckle members each provided on said safety belt of the vehicle, one of said belt-buckle members being secured to one of said strap members for the control of said striker device.

9. Apparatus according to claim 8, wherein said third means comprises a feeler on one of said strap members, a cavity in one of said belt-buckle members, and means for normally urging said feeler into said cavity, subject to displacement of the feeler out of said cavity in response to entry into the latter of the other belt-buckle member whereby said third means is placed into operative position.

10. Apparatus according to claim 9, wherein said system includes a latch in form of a bellcrank level having one arm constituting said striker device another arm, and wherein said feeler is carried by said one arm.

* * * * *